United States Patent
Hochgraf et al.

(10) Patent No.: US 8,828,616 B2
(45) Date of Patent: *Sep. 9, 2014

(54) LIFE EXTENSION OF PEM FUEL CELL USING STARTUP METHOD

(75) Inventors: Clark G. Hochgraf, Honeoye Falls, NY (US); Paul Taichiang Yu, Pittsford, NY (US); Frederick T. Wagner, Fairport, NY (US); Robert S. Foley, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1055 days.

This patent is subject to a terminal disclaimer.

(21) Appl. No.: 12/262,785

(22) Filed: Oct. 31, 2008

(65) Prior Publication Data

US 2010/0112382 A1    May 6, 2010

(51) Int. Cl.
*H01M 8/04* (2006.01)

(52) U.S. Cl.
CPC ...... *H01M 8/04753* (2013.01); *H01M 8/04223* (2013.01); *Y02T 90/32* (2013.01); *Y02E 60/50* (2013.01); *H01M 8/0494* (2013.01); *H01M 2250/20* (2013.01)
USPC .......................................... 429/429; 429/430

(58) Field of Classification Search
CPC ................ H01M 8/04223; H01M 8/04753; H01M 8/0494
USPC .......................................... 429/22, 429, 430
See application file for complete search history.

(56) References Cited

U.S. PATENT DOCUMENTS

| | | | |
|---|---|---|---|
| 6,835,479 B2 * | 12/2004 | Balliet et al. | 429/429 |
| 6,969,633 B2 | 11/2005 | Dennison | |
| 7,270,904 B2 | 9/2007 | Yu et al. | |
| 2002/0076582 A1 | 6/2002 | Reiser et al. | |
| 2002/0076583 A1 | 6/2002 | Reiser et al. | |
| 2002/0102443 A1 | 8/2002 | Yang et al. | |
| 2004/0001980 A1 * | 1/2004 | Balliet et al. | 429/13 |
| 2004/0081866 A1 * | 4/2004 | Bekkedahl et al. | 429/19 |
| 2005/0221148 A1 | 10/2005 | Goebel | |
| 2006/0046106 A1 | 3/2006 | Yu et al. | |
| 2008/0003465 A1 | 1/2008 | Yu et al. | |
| 2008/0026268 A1 * | 1/2008 | Zeng | 429/19 |
| 2009/0081496 A1 * | 3/2009 | Robb et al. | 429/14 |

FOREIGN PATENT DOCUMENTS

CN       101123309 A    2/2008

* cited by examiner

*Primary Examiner* — Milton I Cano
*Assistant Examiner* — Stephen Yanchuk
(74) *Attorney, Agent, or Firm* — John A. Miller; Miller IP Group, PLC

(57) ABSTRACT

A fuel cell system that employs a technique for reducing or significantly eliminating the MEA degradation that occurs as a result of the hydrogen-air front in the anode flow channels at system start-up. After system shut-down, any hydrogen remaining within the anode flow channels will be quickly reacted or diffused. At the next start-up, a switch is closed to provide a dead short across the positive and negative terminals of the fuel cell stack as hydrogen is being introduced into the anode flow channels. The existing air in the cathode flow channels reacts with the hydrogen being introduced across the membrane in the normal fuel cell reaction. However, the short prevents a voltage potential across the membrane.

12 Claims, 1 Drawing Sheet

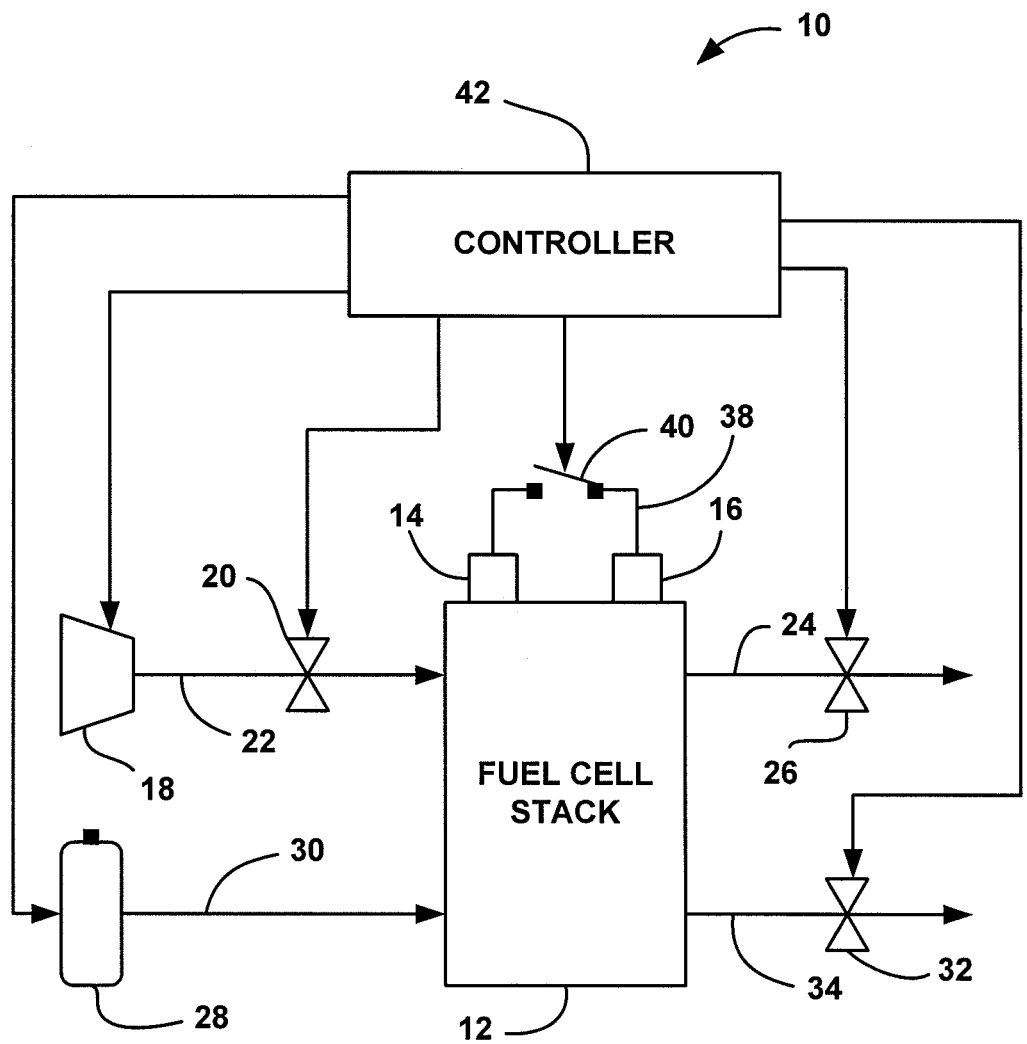

LIFE EXTENSION OF PEM FUEL CELL USING STARTUP METHOD

BACKGROUND OF THE INVENTION

1. Field of the Invention

This invention relates generally to a system and method for reducing catalyst degradation in the MEAs of a fuel cell stack at system start-up and, more particularly, to a system and method for reducing catalyst degradation in the MEAs of a fuel cell stack at system start-up that include shorting the terminals of the fuel cell stack to reduce the voltage potential created by the air/hydrogen front in the anode side of the fuel cells in the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

When a fuel cell stack is shut down, there is still hydrogen in the anode flow channels. The hydrogen fairly quickly dissipates, reacts and/or is absorbed from or in the fuel cell stack, and replaced with air. Therefore, at the next system start-up, both the cathode and anode flow channels generally are filled with air. When hydrogen is introduced into the anode flow channels at system start-up, the hydrogen pushes out the air in the anode flow channels creating a hydrogen-air front that travels through the anode flow channels. The hydrogen-air front causes a catalytic reaction along the length of the membrane in each fuel cell as the front moves that, in combination with the reaction across the membrane, creates a high electric voltage potential. This combined electric voltage potential is high enough to severely degrade the catalyst and the carbon particles on which the catalyst is formed, reducing the life of the MEAs in the fuel cell stack. Particularly, the reaction created by the hydrogen-air front in combination with the normal fuel cell reaction is orders of magnitude greater than only the fuel cell reaction across the membrane. For example, it has been shown that without addressing the degradation effects of the hydrogen-air front at system start-up, it only takes about 100 shut-down and start-up cycles to destroy the fuel cell stack in this manner.

It has been proposed in the art to reduce the degradation effect of the hydrogen-air front at system start-up by forcing the hydrogen through the anode flow channels as quickly as possible so as to reduce the time that the degradation occurs. It has also been suggested to introduce the hydrogen into the anode flow channels at a slow rate to provide active mixing of the air and hydrogen to eliminate the hydrogen-air front. It has also been proposed in the art to cool the fuel cell before removing the hydrogen from the anode flow channels. However, all of these solutions have not reduced the hydrogen-air degradation enough to provide a desired lifetime of the fuel cell stack. Particularly, moving the hydrogen-air front quickly does not completely eliminate the degradation of the catalyst, and requires over-sized piping and other components to rapidly purge the air from the anode flow channels. Introducing the hydrogen slowly at start-up has the disadvantage of requiring a recirculation pump that takes several minutes to completely remove the air from the anode flow channels. Further, requiring precise control of the amount of hydrogen into the anode flow channels is difficult to implement.

It has also been proposed in the art to replace the materials in the MEAs so that the carbon is less susceptible to the hydrogen-air reaction. One example is to use graphitized carbon. However, there are certain problems with this solution that reduce the performance of the fuel cell stack.

It has also been proposed in the art to provide a load across the fuel cell stack, such as a resistor, to reduce the electric potential generated by the hydrogen-air front. However, this technique has the disadvantage that the resistor's power and energy rating are large, making the resistor heavy and difficult to package in an engine compartment of the vehicle.

SUMMARY OF THE INVENTION

In accordance with the teachings of the present invention, a fuel cell system is disclosed that employs a technique for reducing or significantly eliminating the MEA degradation that occurs as a result of the hydrogen-air front in the anode flow channels at system start-up. After system shut-down, any hydrogen remaining within the anode flow channels will be quickly reacted or diffused. At the next start-up, a switch is closed to provide a dead short across the positive and negative terminals of the fuel cell stack as hydrogen is being introduced into the anode flow channels. The existing air in the cathode flow channels reacts with the hydrogen being introduced across the membrane in the normal fuel cell reaction. However, the short prevents a voltage potential across the membrane. The voltage potential generated by the hydrogen-air front along the membrane in the anode side of the fuel cells does not provide a significant enough voltage potential to provide significant degradation of the MEAs.

Additional features of the present invention will become apparent from the following description and appended claims, taken in conjunction with the accompanying drawings.

BRIEF DESCRIPTION OF THE DRAWING

FIG. 1 is a schematic block diagram of a fuel cell system employing a technique for reducing or significantly eliminating the start-up degradation of the MEA catalyst as a result of the hydrogen-air front in the anode flow channels, according to an embodiment of the present invention.

DETAILED DESCRIPTION OF THE EMBODIMENTS

The following discussion of the embodiments of the invention directed to a technique for reducing or eliminating MEA degradation as a result of a hydrogen-air front in the anode flow channels in the fuel cell stack at system start-up is merely exemplary in nature, and is in no way intended to limit the invention or its applications or uses.

FIG. 1 is a schematic block diagram of a fuel cell system 10 including a fuel cell stack 12 having a positive terminal 14 and a negative terminal 16. A compressor 18 provides cathode inlet air through a cathode inlet valve 20 and a cathode inlet line 22 to the fuel cell stack 12, and cathode exhaust gas is output from the fuel cell stack 12 on a cathode exhaust gas line 24 through a cathode outlet valve 26. Hydrogen from a hydrogen source 28 is provided to the anode side of the fuel cell stack 12 on an anode inlet line 30. Anode exhaust gas is output from the fuel cell stack 12 through an anode outlet valve 32 on outlet line 34.

According to the invention, the fuel cell stack 12 includes a shorting line 38 electrically coupled to the positive terminal 14 and the negative terminal 16. A switch 40 is selectively opened and closed to apply a dead short using the line 38 across the stack 12 when the switch 40 is closed and remove the dead short when the switch 40 is opened. A controller 42 controls the position of the switch 40, the operation of the compressor 18, the hydrogen source 28 and the opening and closing of the valves 20, 26 and 32.

As discussed above, both the cathode side and the anode side of the stack 12 are filled with air fairly quickly after system shut-down. The present invention proposes controlling the valves 20 and 26 and the switch 40 to reduce the MEA degradation of the fuel cells in the fuel cell stack 12 at the next system start-up. Particularly, at start-up, the controller 42 simultaneously, or nearly simultaneously, opens the hydrogen source 28 to provide hydrogen to the anode side of the stack 12, opens the outlet valve 32, closes the inlet valve 20, closes the outlet valve 26 and closes the switch 40, providing a dead short across the terminals 14 and 16.

As hydrogen is introduced into the anode flow channels in the fuel cell stack 12 with the system 10 in this configuration, each fuel cell will provide a reaction in the normal manner across the membranes therein. However, the dead short across the positive terminal 14 and the negative terminal 16 will prevent a voltage potential to be provided across the membranes. The hydrogen-air front that moves through the anode flow channels along the membranes and out of the anode exhaust gas line 34 does create a voltage potential, but is not significant enough when it is not combined with the normal voltage potential across the membranes to cause significant MEA degradation.

When the air is nearly completely consumed in the cathode side of the fuel cell stack 12 by the MEA reaction, the hydrogen-air front will have passed through the anode flow channels, or nearly passed through the anode flow channels. At this time, the controller 42 will open the switch 40 removing the dead short. The valves 20 and 26 can then be opened and the compressor 18 can be started so that the fuel cell stack voltage is allowed to increase normally as an open circuit potential. The duration that the switch 40 is closed is typically very small depending on the fuel cell stack design, and may be on the order 0.2-2.0 seconds.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including an anode side, a cathode side, a positive terminal and a negative terminal, said fuel cell stack further including a shorting line electrically coupled to the positive terminal and the negative terminal;
a switch electrically coupled to the shorting line that can be selectively opened and closed to provide or remove a dead short across the fuel cell stack;
a cathode inlet valve for closing off cathode flow channels at the inlet to the fuel cell stack;
a cathode outlet valve for closing off the cathode flow channels at the outlet of the fuel cell stack;
a hydrogen source for providing hydrogen to the anode side of the fuel cell stack; and
a controller configured to control the cathode inlet valve, the cathode outlet valve, the switch and the hydrogen source, said controller simultaneously or nearly simultaneously closing the switch, closing the cathode inlet valve, closing the cathode outlet valve and opening the hydrogen source so that hydrogen is provided to the anode side of the fuel cell stack and existing air in the cathode side of the fuel cell stack reacts with the hydrogen being introduced to the anode side of the fuel cell stack without creating a voltage potential as a result of the short.

2. The system according to claim 1 wherein the controller opens the cathode inlet valve and the cathode outlet valve after most of the air is consumed in the cathode side of the stack.

3. The system according to claim 2 further comprising a compressor for providing a cathode inlet airflow to the cathode side of the stack after the cathode inlet valve and the cathode outlet valve are opened.

4. The system according to claim 1 wherein the controller closes the switch, closes the cathode inlet valve, closes the cathode outlet valve and opens the hydrogen source at system start-up.

5. The system according to claim 1 wherein the controller only closes the switch for a period of time less than 2 seconds.

6. The system according to claim 1 wherein the fuel cell system is on a vehicle.

7. A fuel cell system comprising:
a fuel cell stack including an anode side, a cathode side, a positive terminal and a negative terminal, said fuel cell stack further including a shorting line electrically coupled to the positive and negative terminals; and a switch electrically coupled to the shorting line that can be selectively opened or closed to provide or remove a dead short across the fuel cell stack, said switch being closed at system start-up to eliminate the voltage potential across the membranes in the stack so as to reduce or significantly eliminate MEA degradation as a result of a hydrogen-air front in the anode flow channels.

8. The system according to claim 7 further comprising a cathode inlet valve for closing off cathode flow channels at the inlet to the fuel cell stack and a cathode outlet valve for closing off the cathode flow channels at the outlet of the fuel cell stack when the switch is closed.

9. The system according to claim 7 wherein the switch is closed for a period of time less than 2 seconds.

10. The system according to claim 7 wherein the fuel cell system is on a vehicle.

11. The system according to claim 7 wherein the switch is closed for a period of time to allow the hydrogen-air front to pass through the anode flow channels.

12. The system according to claim 7 wherein the switch is closed for a period of time to allow the hydrogen-air front to nearly pass through the anode flow channels.

* * * * *